US010713422B2

(12) United States Patent
Han et al.

(10) Patent No.: US 10,713,422 B2
(45) Date of Patent: Jul. 14, 2020

(54) METHOD OF EDITING DOCUMENT IN MOBILE TERMINAL AND MOBILE TERMINAL USING THE SAME

(71) Applicant: Samsung Electronics Co., Ltd., Gyeonggi-do (KR)

(72) Inventors: Youngeun Han, Gyeonggi-do (KR); Gyuhee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/523,699

(22) Filed: Oct. 24, 2014

(65) Prior Publication Data

US 2015/0121208 A1 Apr. 30, 2015

(30) Foreign Application Priority Data

Oct. 25, 2013 (KR) ........................ 10-2013-0128076

(51) Int. Cl.
*G06F 17/20* (2006.01)
*G06F 40/166* (2020.01)
*G06F 3/0488* (2013.01)

(52) U.S. Cl.
CPC .......... *G06F 40/166* (2020.01); *G06F 3/0488* (2013.01); *G06F 3/04883* (2013.01)

(58) Field of Classification Search
CPC .................................................... G06F 3/04883
See application file for complete search history.

(56) References Cited

U.S. PATENT DOCUMENTS 5,801,693 A * 9/1998 Bailey ..................... G06F 9/543 715/769
6,309,305 B1 * 10/2001 Kraft ....................... G06F 9/543 455/414.1
8,854,324 B2 10/2014 Mukai et al.
2003/0014382 A1 * 1/2003 Iwamoto ................. G06F 9/543
2004/0119762 A1 6/2004 Denoue et al.
2005/0149848 A1 * 7/2005 Broman .................. G06F 17/24 715/220
2009/0140998 A1 * 6/2009 Jung ..................... G06F 3/0488 345/173
2011/0125970 A1 * 5/2011 Commarford .......... G06F 9/543 711/126
2012/0293427 A1 * 11/2012 Mukai ................. G06F 3/04883 345/173
2013/0290889 A1 * 10/2013 Bao ....................... G06F 17/211 715/770
2014/0333567 A1 11/2014 Mukai et al.
2015/0015604 A1 * 1/2015 Kim .................... G06F 3/04842 345/626

FOREIGN PATENT DOCUMENTS

EP 2511810 A2 10/2012
KR 10-2009-0128294 12/2009

OTHER PUBLICATIONS

Extended European Search Report dated Feb. 25, 2015 in connection with European Patent Application No. 14187350.5; 7 pages.

* cited by examiner

*Primary Examiner* — Shahid K Khan

(57) ABSTRACT

A mobile terminal is configured to perform a method of editing a document. The method may include storing data corresponding to a copying event, sensing an input for attaching the data, and attaching at least part of the data corresponding to the input.

12 Claims, 13 Drawing Sheets

START
210 DOCUMENT WRITING MODE
220 COPYING EVENT SENSED? NO / YES
230 STORE DATA CORRESPONDING TO COPYING EVENT
240 ATTACHMENT INPUT SENSED? NO / YES
250 ATTACH AT LEAST PART OF DATA CORRESPONDING TO INPUT
260 DOCUMENT WRITING TERMINATION REQUEST GENERATED? NO / YES
END

The US and EU are discussing "deeper sanctions" against Russia if there are "further incursions into Ukraine".
US President Barack Obama said "energy obviously a central focus of our efforts", acknowledging it "will have some impact on the global economy".He was speaking after talks in Brussels with EU leaders.

In a keynote speech later, he said Russians "will recognise that they cannot achieve security, prosperity and status... through brute force".
Mr Van Rompuy called Russia's actions in Crimea "a disgrace in the 21st Century, and we will not recognise it".

FIG. 7
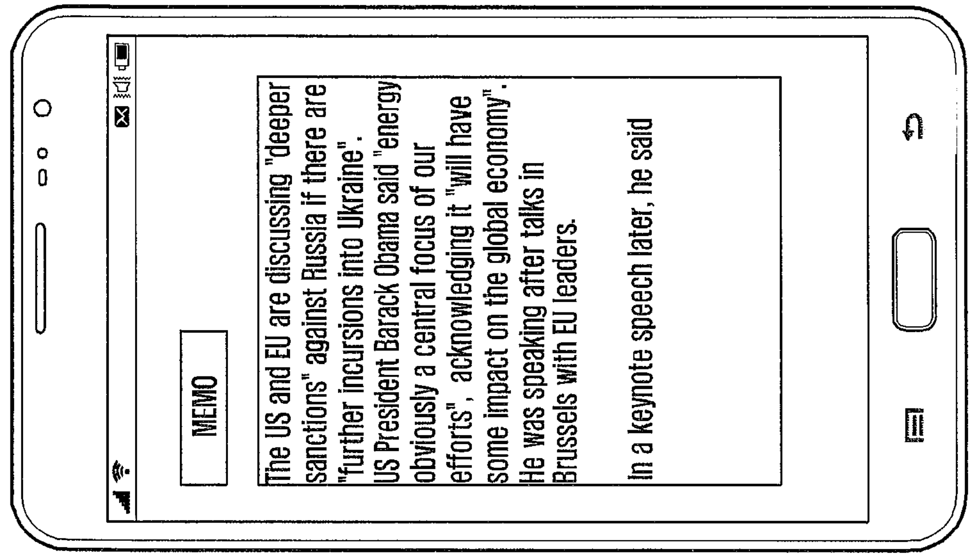
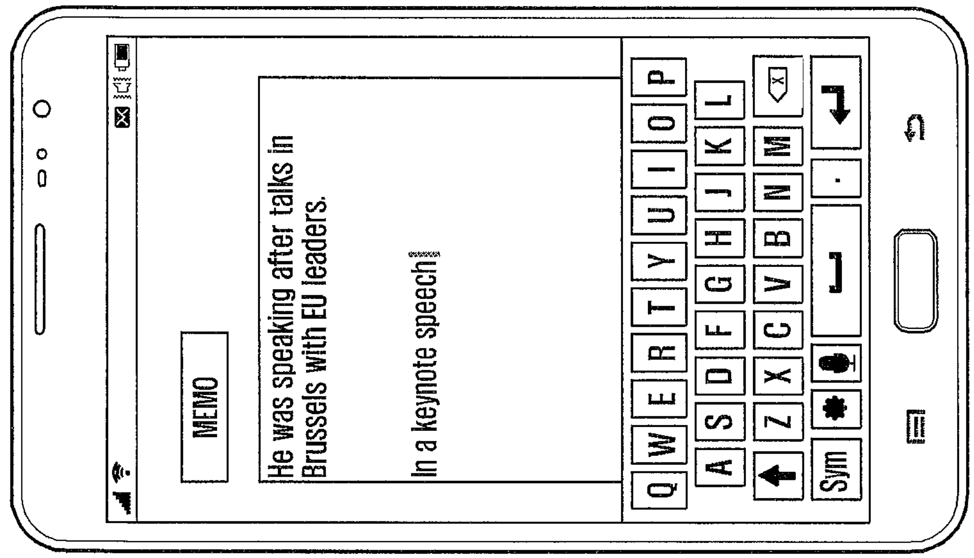

METHOD OF EDITING DOCUMENT IN MOBILE TERMINAL AND MOBILE TERMINAL USING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Oct. 25, 2013 in the Korean intellectual property office and assigned serial No. 10-2013-0128076, the entire disclosure of which is hereby incorporated by reference.

TECHNICAL FIELD

The present disclosure relates to a method of editing a document in a mobile terminal and a mobile terminal using the same and, more particularly, to a method of editing a document in a mobile terminal and a mobile terminal using the same, wherein data stored in a clipboard is selectively attached in response to a user input.

BACKGROUND

Recent mobile terminals have been equipped with complex functions, such as photographing of photographs or moving images, playback of music files or moving image files, gaming, reception of broadcasting, and support of wireless Internet, and have been implemented in the form of complex multimedia players. Accordingly, recent mobile terminals have been developed in a new form from hardware and software viewpoints in order to satisfy user needs and also to enhance portability and convenience.

As convenience of mobile terminals is improved, users want to use a letter input and editing function, such as transmission of a memo, e-mail, and a message through the mobile terminal, more conveniently.

In some letter input and editing functions, when attaching data temporarily stored in a clipboard to a specific input region, all of the data is automatically attached to the input region. Accordingly, a user who wants to attach only part of the data has to inconveniently perform an additional edit process after all of the data is attached.

For this reason, a user may demand a function with improved convenience that is capable of selecting desired data in various ways and storing the selected data in a clipboard or selectively attaching the stored data.

SUMMARY

To address the above-discussed deficiencies, it is a primary object to provide a method of editing a document in a mobile terminal and a mobile terminal using the same, wherein data stored in a clipboard is selectively attached in response to a user input.

The present disclosure may further provide a method of editing a document in a mobile terminal and a mobile terminal using the same, wherein data is stored in a clipboard and part of the stored data is selectively attached in response to a user input.

In accordance with another aspect of the present disclosure, an electronic device includes an input unit for sensing a user input, a memory unit for storing data, a display unit for displaying data, and a control unit for storing data corresponding to a copying event in the memory unit and attaching at least part of the data, corresponding to an input for attaching the data, when the input for attaching the data is sensed through the input unit.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a diagram illustrating an example of data that is copied to a clipboard in accordance with various embodiments of the present disclosure.

FIGS. 4 to 7 are diagrams illustrating examples in which part of data is attached in accordance with various embodiments of the present disclosure.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The present embodiment may be applied in order to control a mobile terminal which provides a document editing function.

Furthermore, the mobile terminal providing the document editing function according to the present embodiment may include common electronic terminals, such as a smart phone, a portable terminal, a mobile terminal, a Personal Digital Assistant (PDA), a Portable Multimedia Player (PMP) terminal, a note pad, a Wibro terminal, and a tablet PC, and all devices which provide document editing functions.

Technical terms used in this specification are used to describe only specific embodiments, and it is to be noted that the terms are not intended to limit the present disclosure. Furthermore, the technical terms used in this specification should be interpreted as having meanings that are commonly understood by a person having ordinary skill in the art to which the present disclosure pertains, unless especially defined as other meanings in this specification, and should not be interpreted as having excessively comprehensive meanings or excessively reduced meanings.

Furthermore, an expression of the singular number used in this specification includes an expression of the plural number unless clearly defined otherwise in the context. In this application, terms, such as "comprise" and "include", should not be interpreted as essentially including all of several elements or several steps described in the specification.

Some embodiments of the present disclosure are described in detail below with reference to the accompanying drawings.

Figure 1:
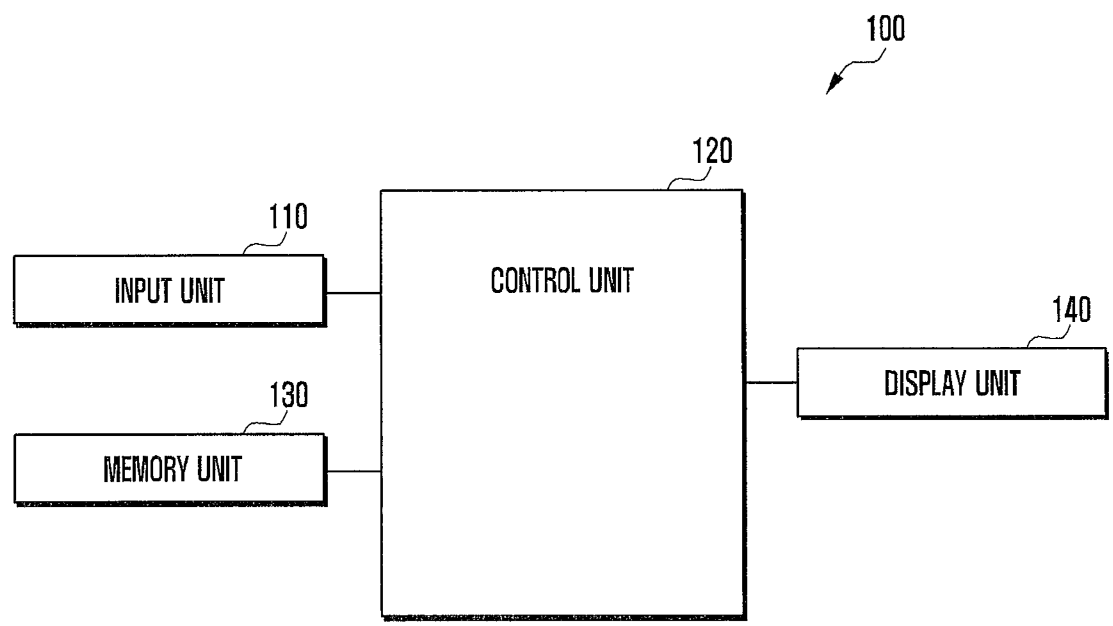
FIG. 1 is a block diagram of a mobile terminal in accordance with the present disclosure.

FIG. 1 is a block diagram of a mobile terminal in accordance with the present disclosure.

Referring to FIG. 1, the mobile terminal 100 in accordance with the present disclosure may be configured to include an input unit 110, a control unit 120, a memory unit 130, and a display unit 140.

The input unit 110 detects a user input and transfers an input signal corresponding to the user input to the control unit 120. The input unit 110 may be configured to include a key pad, a dome switch, a touch pad (resistive/capacitive), a jog wheel, a jog switch, a finger mouse, or a wheel.

The input unit 110 may be configured to include a touch sensor, a proximity sensor, an electromagnetic sensor, a pressure sensor, and so on. The input unit 110 can sense a user's touch input or proximity input through a sensor. The input unit 110 may be configured as an input pad in which a sensor is attached to a pad in a film form or a sensor is combined with a pad in a panel form.

For example, the input unit 110 may be configured as an input pad which uses an Electro Magnetic Resonance (EMR) method or an Electro Magnetic Interference (EMI) method using an electromagnetic sensor.

The input unit 110 may form a layer structure together with the display unit 140 and operate as an input screen. For example, the input unit 110 may include an input pad equipped with a touch sensor and may be configured as a Touch Screen Panel (TSP) combined with the display unit 140. The input unit 110 that forms a layer structure with the display unit 140 may also be called a touch screen.

In various embodiments of the present disclosure, the input unit 110 can sense a user input for writing and editing a document. More particularly, the input unit 110 can sense an input for copying data that forms a document or an input for attaching data to a document.

The control unit 120 can control the elements in order to perform the overall operation of the mobile terminal 100. For example, the control unit 120 can control the elements so that the elements perform operations related to the display, writing, and editing of a document through an application, a program, service, etc., which provide a document viewer or a document editing function.

In various embodiments of the present disclosure, the control unit 120 can store data, corresponding to a copying event, in the memory unit 130 when the copying event is sensed. Furthermore, the control unit 120 can attach data, stored in the memory unit 130, to a document when an attachment input is sensed. Here, the control unit 120 may attach only part of data, corresponding to the attachment input, to the document. Furthermore, the control unit 120 can delete part of the attached data from the stored data. When an additional input for attachment is sensed, the control unit 120 may successively attach data from which part of the attached data has already been removed to the document.

The operation of the control unit 120 is described in more detail later.

The memory unit 130 can store programs or commands for the mobile terminal 100. The control unit 120 can perform programs or commands stored in the memory unit 130.

The memory unit 130 may include at least one of various storage media, such as a flash memory type, a hard disk type, a multimedia card micro type, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

In accordance with an embodiment of the present disclosure, the memory unit 130 can store one or more data corresponding to a copying event. The data may be stored in a space of the memory unit 130, which has been allocated as a clipboard. The memory unit 130 can store the one or more data in association with information about the attributes of the data. The attributes of the data may include, for example, the alphabet, figures, numbers, and special symbols.

The display unit 140 displays (or outputs) information processed by the mobile terminal 100. For example, the display unit 140 can display information about a document along with a User Interface (UI) or a Graphic User Interface (GUI) in a document viewer or a document editing mode.

The display unit 140 may be implemented in the form of a touch screen. The touch screen can function to display information and receive a user input for displayed information.

The touch screen may include a touch panel that is attached to an image display device as an adhesive layer. The image display device outputs an image and may include a Liquid Crystal Display (LCD) device, a Plasma Display Panel (PDP), electroluminescence (EL), or a Cathode Ray Tube (CRT). The touch panel senses touch coordinates for the hand of a user or the input of an object. The touch panel may use various methods, such as a resistive type, a capacitive type, an electromagnetic type, a Surface Acoustic Wave (SAW) type, and an infrared type. If a capacitive type is used in the touch panel, the touch panel can sense an input using an electronic pen, including conductive materials or a coil that generates electrostatic induction, in addition to the human body. In an implementation, the touch panel may sense a proximity input within a specific distance of a touch screen.

It is to be noted that the elements of FIG. 1 are not essential and the mobile terminal 100 including a smaller or larger number of elements may be implemented.

A document editing method of the mobile terminal 100 in accordance with the present disclosure is described in more detail below.

Figure 2:
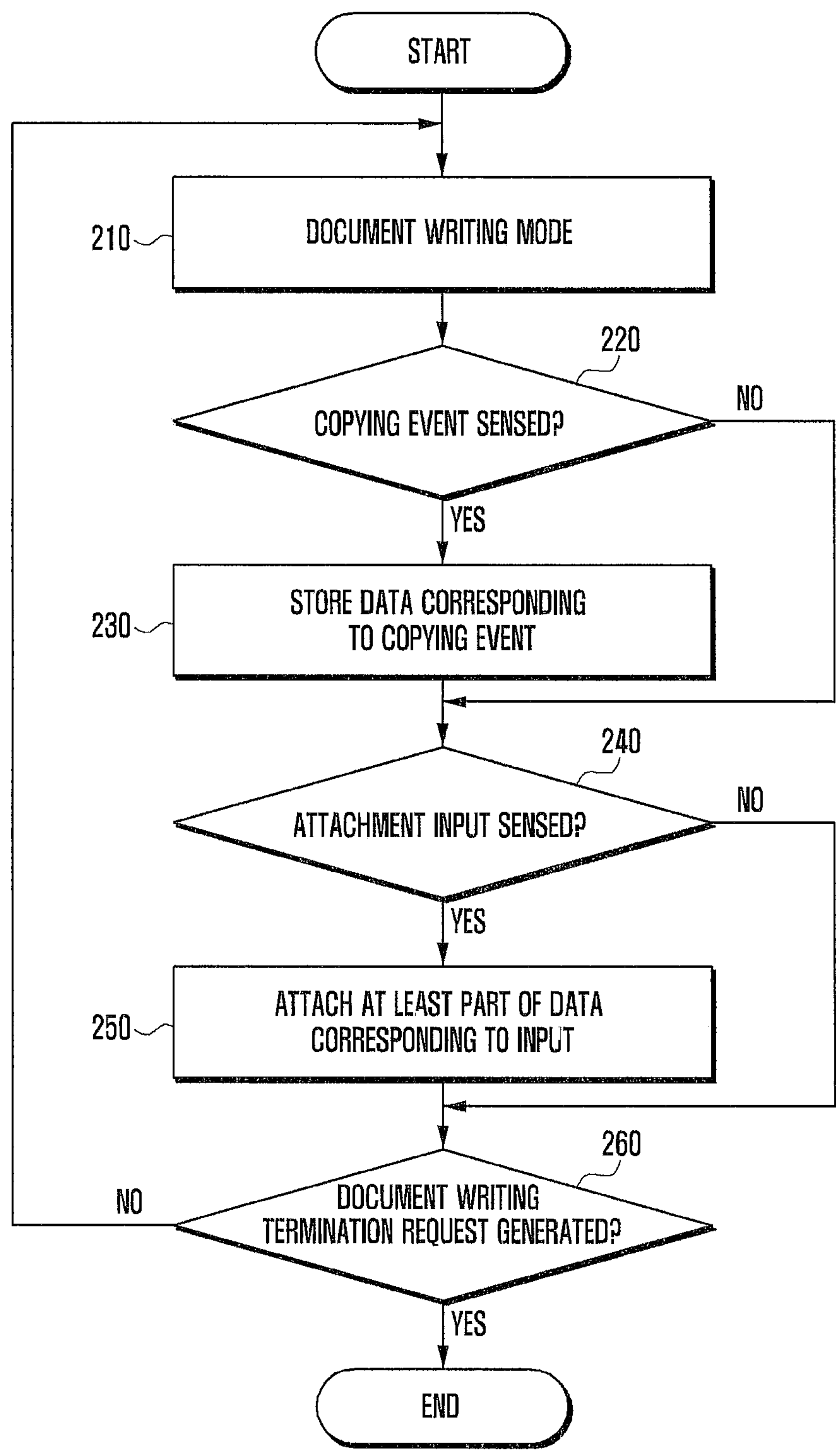
FIG. 2 is a flowchart illustrating a method of editing a document in the mobile terminal in accordance with various embodiments of the present disclosure.
Figure 4:
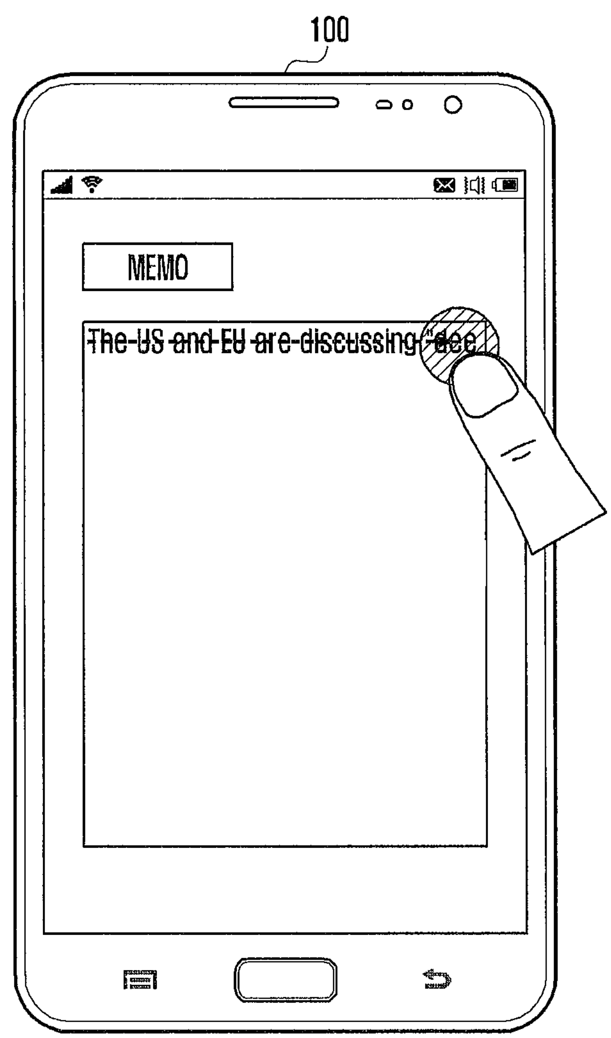
Figure 5:
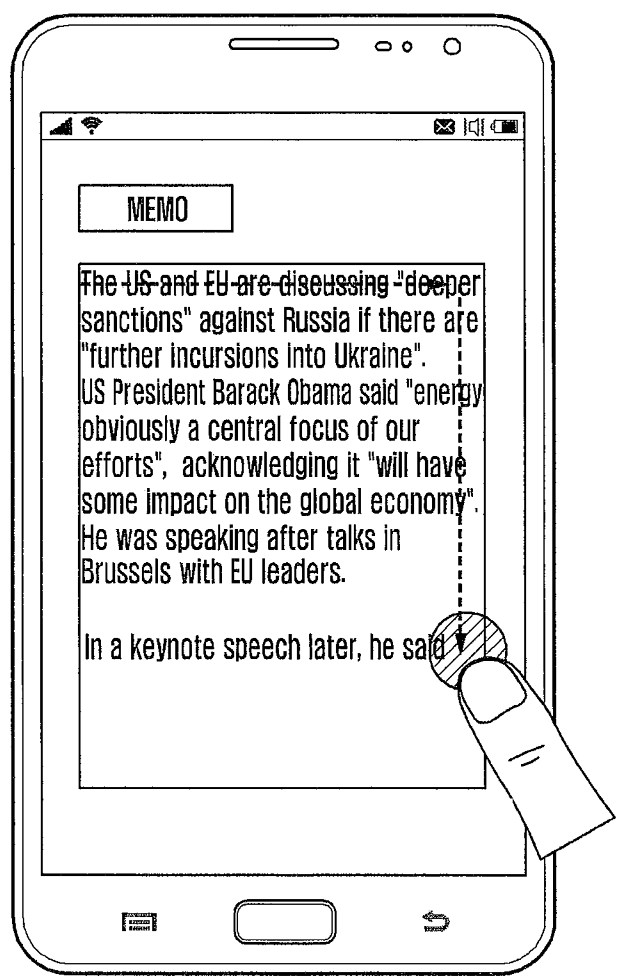

FIG. 2 is a flowchart illustrating a method of editing a document in the mobile terminal in accordance with various embodiments of the present disclosure.

Referring to FIG. 2, first, the control unit 120 may operate in a document writing mode at operation 210.

In the document writing mode, the control unit 120 may control an application, a program, or a service for providing the document writing function. The application, program, or service for providing the document writing function may be an application, a program, or a service for providing functions related to a memo pad, a text message, e-mail, SNS service, a diary, and an E-book, for example.

In the document writing mode, the control unit 120 can sense user inputs for input, editing, and deletion and perform operations corresponding to the user inputs.

Next, the control unit 120 can determine whether or not a copying event is sensed at operation 220.

The copying event may be an event for requesting specific data to be temporarily or permanently stored in the memory unit 130. The copying event may be generated in response to an application, program, or service or may be generated in response to a user input. In the document writing mode, the input unit 110 can sense a user input and transfer a control signal, corresponding to the sensed user input, to the control unit 120. The control unit 120 can determine whether or not a user input for copying has been sensed by analyzing the received control signal. The user input that generates the copying event may be a long press input, a touch input, a double touch input, a touch & drag input, a hovering input, a copying menu input, or an icon selection input, for example.

When the copying event is generated, the control unit 120 stores data corresponding to the copying event at operation 230.

When the copying event is generated, the control unit 120 can obtain information about the object to be copied in response to an application or a control signal corresponding to a user input, that is, information about data corresponding to the copying event. The data corresponding to the copying event forms a document that is being written, and the data may be the alphabet, an image, etc.

Referring to FIG. 3, a user may generate a long press input to the first alphanumeric data of data to be copied and then generate a drag input up to the last letter of the data to be copied. The control unit 120 senses the copying event in response to the user input and stores the data corresponding to the event. In the embodiment of FIG. 3, the control unit 120 can determine that a copying input to letter data reading 'The US and EU are . . . we will not recognize it".' within a document that is being written has occurred.

The control unit 120 can extract the data corresponding to the copying event and store the extracted data in the memory unit 130 temporarily or permanently. The data may be stored in a space of the memory unit 130 which is allocated for a clipboard.

In the embodiment of FIG. 3, the control unit 120 may temporarily store the letter data 'The US and EU are . . . we will not recognize it".' in the clipboard.

Next, the control unit 120 determines whether or not an attachment input is sensed at operation 240.

In the document writing mode, the input unit 110 can sense a user input, generate a control signal corresponding to the sensed user input, and transfer the control signal to the control unit 120. The control unit 120 can determine whether or not an attachment input has been sensed by analyzing the received control signal.

In various embodiments of the present disclosure, the attachment input may be a long press input, a touch input, a double touch input, a touch & drag input, a hovering input, an attachment menu input, or an icon selection input, for example.

When the attachment input is sensed, the control unit 120 attaches at least part of the data corresponding to the attachment input at operation 250.

When the attachment input is sensed, the control unit 120 can obtain input attribute information, including information about the position where the attachment input was generated, information about the direction of the attachment input, information about the length of the attachment input, and information about a shape of the attachment input, from an application or a control signal corresponding to a user input. For example, if the attachment input is a touch & drag input, the control unit 20 can obtain information about the position where a touch has occurred and the direction and length of a drag. The control unit 120 can determine the position to which data will be attached and at least part of data to be attached based on the information about the attachment input.

The control unit 120 attaches at least part of the data, corresponding to the attachment input, to the position where the attachment input was sensed. Here, the control unit 120 can extract part of the data to be attached based on input attributes including at least one of the position, direction, length, and shape of the attachment input. Part of the data may be part of all alphanumeric data that form the data or part of an image. In various embodiments, the control unit 120 can attach part of data in a specific unit. For example, if data includes alphabetic data, the control unit 120 can attach part of the data in each letter unit, each letter unit, each sentence unit, or each paragraph unit. In an implementation, the control unit 120 may cancel (i.e., delete) part of the attached data in response to an input.

In one embodiment, when an input in a first direction is sensed, the control unit 120 may attach some letters corresponding to the length of the input, from among all letters that form data, in a letter unit. For example, referring to FIG. 4, when an input in the rightward direction is sensed, the control unit 120 may attach at least one letter corresponding to the length of the input, from the data copied in the embodiment of FIG. 3, to the position where the input was generated. Here, the control unit 120 can sequentially attach letters one by one, that is, in single units, while the input moves in the rightward direction. The control unit 120 sequentially attaches letters until the release of the input is sensed. Accordingly, when the input is released, part of data corresponding to the length of the input is attached.

In one embodiment, when an input in a second direction is sensed, the control unit 120 may attach some letters corresponding to the length of the input, from among all letters that form data, in a multiple letter unit. For example, referring to FIG. 5, when an input in a downward direction is sensed, the control unit 120 may attach at least one letter corresponding to the length of the input, from the data copied in the embodiment of FIG. 3, to the position where the input was generated. Here, the control unit 120 can attach letters in a multiple letter unit while the input moves in the downward direction. In various embodiments, the multiple unit may include a specific number (that may correspond to the number of bytes or bits) of letters depending on a layout of a document that is being written (e.g., the horizontal/vertical lengths of a document), the input attributes (e.g., a font and a letter size) of a document, and so on. The control unit 120 attaches letters in a multiple letter unit until the release of the input is sensed. When the input is released, part of data corresponding to the length of the input is attached.

Figure 6A:
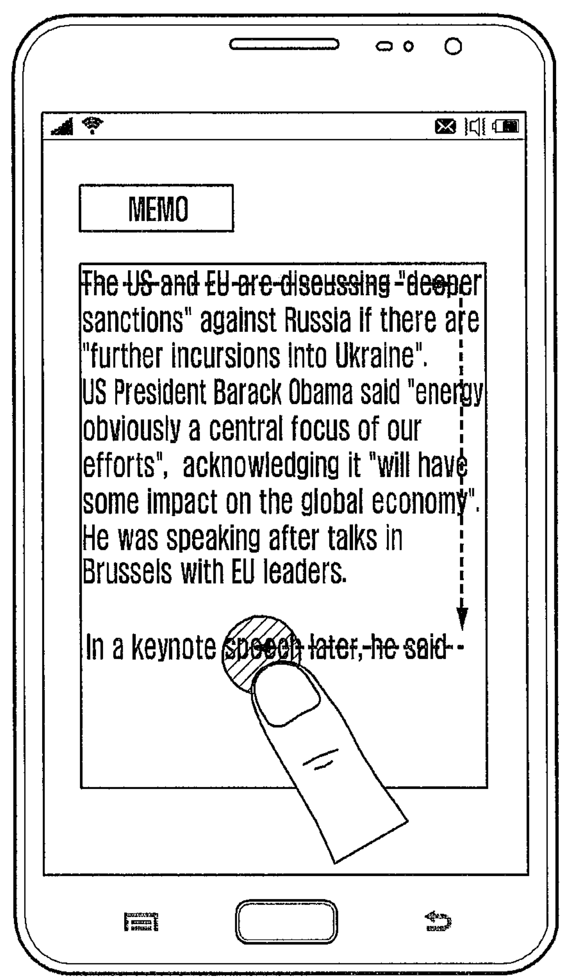
Figure 6B:
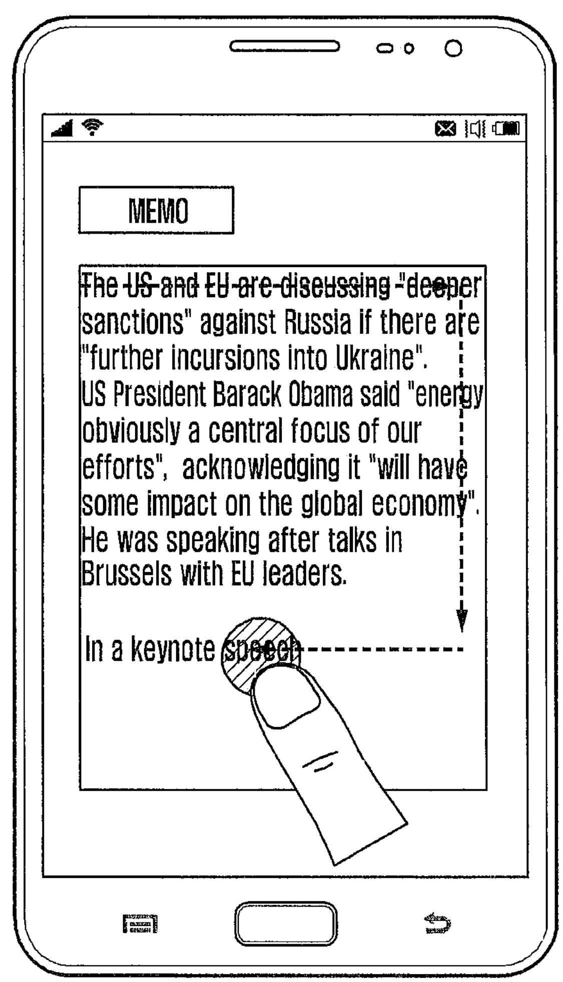

In one embodiment, when an input in a third direction is sensed, the control unit 120 may delete part of attached data corresponding to the input. Here, the third direction may be opposite to the first direction or the second direction in which the data was attached. For example, when an input in a leftward direction is sensed as shown in FIG. 6A, the control unit 120 may delete copied data in single letter units as shown in FIG. 6B. Although not shown, in another embodiment, when an input in an upward direction is sensed, the control unit 120 may delete copied data in a multiple letter unit.

When attaching part of data, the control unit 120 may modify part of the data according to the input attributes of the position where part of the data is attached and attach the modified data to the position. For example, the control unit 120 may modify the size, color, and visual effects of a letter or an image based on a font, a letter size, a letter color, letter effects, and a layout at the position where the letter or image will be attached and attach the modified letter or image.

In accordance with the technical characteristics of the present disclosure, a user does not attach data to be attached at once, but may selectively attach only a desired part of the data using various inputs. Accordingly, a user can easily modify data to be attached partially. If copied data is attached at once, a user can copy the entire data, move a cursor to the position where data will be modified, and modify a document. If only part of data is selected and attached as in the present disclosure, a user can modify a specific part of a document conveniently by selectively attaching only part of data that does not need to be modified, as shown in FIG. 7.

In the aforementioned embodiments, data including letters has been described as an example in connection with the attachment operation, but the data may include an image. If data includes an image, the aforementioned embodiments may be replaced with an operation of attaching a specific region of the image corresponding to a user input.

When copying is completed in response to the release of the attachment input, the control unit 120 can determine whether or not a document writing termination request has occurred at operation 260.

The document writing termination request may be generated in response to a user input. The document writing termination request may be generated when a menu or icon corresponding to 'close', 'store', or 'end' is selected. The control unit 120 determines whether or not the document writing termination request has occurred in response to a control signal received through the input unit 110.

When the document writing termination request is generated, the control unit 120 terminates the document editing method in accordance with the present disclosure. The control unit 120 can perform a corresponding operation, such as the automatic storage of a document or the termination of an application, in response to the document writing termination request.

If a document writing termination request is not generated, the control unit 120 returns to the document writing mode and repetitively performs the document editing method in accordance with the present disclosure.

In various embodiments of the present disclosure, the control unit 120 can delete part of data that has been attached from the memory unit 130 in response to a user input. Furthermore, when a subsequent additional input for attachment is sensed, the control unit 120 may attach the remaining parts of data remaining in the memory unit 130 successively. Such an embodiment is described in more detail below.

Figure 8:
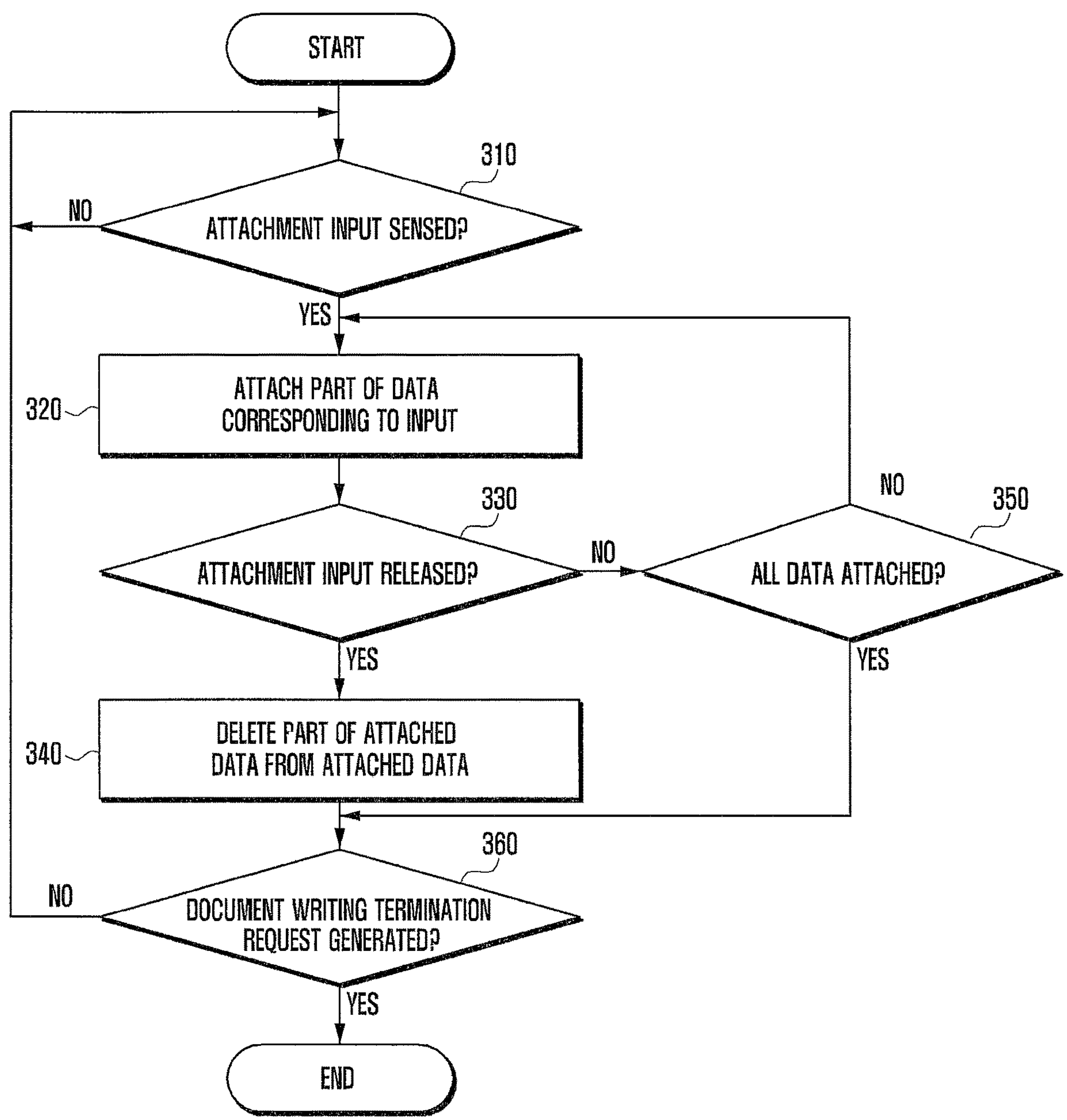
FIG. 8 is a flowchart illustrating a method of editing a document in the mobile terminal in accordance with various embodiments of the present disclosure.

FIG. 8 is a flowchart illustrating a method of editing a document in a mobile terminal in accordance with various embodiments of the present disclosure.

Referring to FIG. 8, the control unit 120 determines whether or not an attachment input is sensed at operation 310.

In the document writing mode, the input unit 110 senses a user input, generates a control signal corresponding to the sensed user input, and transfers the control signal to the control unit 120. The control unit 120 can determine whether or not the attachment input has been sensed by analyzing the received control signal.

In various embodiments of the present disclosure, the attachment input may be, for example, a long press input, a touch input, a double touch input, a touch & drag input, a hovering input, an attachment menu input, or an icon selection input.

When the attachment input is sensed, the control unit 120 attaches at least part of data corresponding to the attachment input at operation 320.

When the attachment input is sensed, the control unit 120 can obtain input attribute information, including information about the position where the attachment input was generated, information about the direction of the attachment input, information about the length of the attachment input, and information about a shape of the attachment input, from an application or a control signal corresponding to a user input. For example, if the attachment input is a touch & drag input, the control unit 20 can obtain information about the position where a touch has occurred and the direction and length of a drag. The control unit 120 can determine the position to which data will be attached and at least part of data to be attached based on the information about the attachment input.

The control unit 120 attaches at least part of the data, corresponding to the attachment input, to the position where the attachment input was sensed. Here, the control unit 120 can extract part of the data to be attached based on input attributes including at least one of the position, direction, length, and shape of the attachment input. Part of the data may be part of all letters that form the data or part of an image. In various embodiments, the control unit 120 can attach part of data in a specific unit. For example, if data includes alphabetic data, the control unit 120 can attach part of the data in each letter unit, each letter unit, each sentence unit, or each paragraph unit. In an implementation, the control unit 120 may cancel (i.e., delete) part of the attached data in response to an input.

The attachment has been described above in detail.

While the attachment is performed, the control unit 120 determines whether or not the attachment input is released at operation 330.

The control unit 120 may determine that the attachment input has been released if a control signal is no longer received from the input unit 110 or a control signal corresponding to the release of the attachment input is received.

When the attachment input is released, the control unit 120 deletes part of the attached data from the attached data at operation 340.

The control unit 120 deletes part of the attached data from the memory unit 130 in response to an input. For example, if the data stored in FIG. 3 is stored in the memory unit 130 and part of the data corresponding to a user input, that is, 'The US and EU are . . . . In a keynote speech', has been attached to a document as shown in FIG. 6, the control unit 120 can delete the part from the memory unit 130. In such a case, the remaining parts from which the attached part has been deleted, that is, 'later, . . . we will not recognize it".', may be stored in the memory unit 130.

If the attachment input is not released, the control unit 120 determines whether or not the entire data has been attached at operation 350.

The control unit 120 determines whether or not the stored data has been completely attached to the document in response to an input. That is, the control unit 120 may determine whether or not a letter (or image) to be attached is no longer present because the copied data has been completely attached.

If the entire data has been attached, the control unit 120 may terminate the attachment operation even though a user input is sensed, because data to be attached is not present. In such a case, if an input corresponds to the deletion of data that has been attached, the control unit 120 may delete the attached data.

If the entire data has not been attached, the control unit 120 continues to attach part of the data corresponding to an input at operation 320.

After deleting part of the attached data from the attached data, the control unit 120 can determine whether or not a document writing termination request has occurred at operation 360.

The document writing termination request may be generated in response to a user input. The document writing termination request may be generated when selecting a menu or an icon corresponding to 'close', 'store', or 'end'. In another embodiment, the document writing termination request may be generated in response to a new input for copying data. The control unit 120 determines whether or not the document writing termination request has occurred based on a control signal received through the input unit 110.

When the document writing termination request is generated, the control unit 120 terminates the document editing method in accordance with the present disclosure. The control unit 120 can perform a corresponding operation, such as the automatic storage of a document or the termination of an application, in response to the document writing termination request.

If a document writing termination request is not generated, the control unit 120 repeatedly determines whether or not the attachment input is sensed at operation 310.

Figure 9:
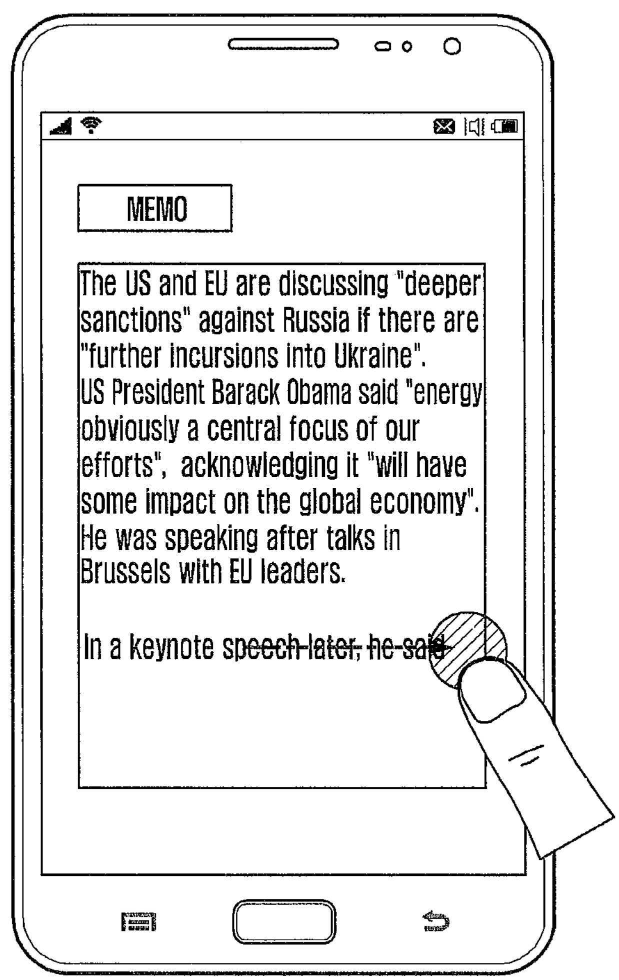
FIG. 9 is a diagram illustrating an example in which part of data is attached in succession in accordance with one of various embodiments of the present disclosure.

If an additional input for attachment is sensed, the control unit 120 attaches at least part of data corresponding to the additional input for attachment, from the data from which already attached data has been deleted. The control unit 120 deletes part of the attached data from the memory unit 130 in response to an input. For example, as shown in FIGS. 6A and 6B, if a part corresponding to a user input, that is, 'The US and EU are . . . . In a keynote speech', is attached to a document, the attached part is deleted from data, and an additional input for attachment is sensed, the control unit 120 attaches the remaining parts from which the attached data was deleted, that is, a part corresponding to the additional input for attachment, as shown in FIG. 9.

In various embodiments of the present disclosure, the control unit 120 may store one or more data in association with their attributes and control the elements so that one or more data corresponding to the input attributes of the position where an input for attachment is sensed can be selectively attached based on the input attributes. Such an embodiment is described in more detail below.

In various embodiments of the present disclosure, the control unit 120 may delete part of attached data from the memory unit 130 in response to a user input. Furthermore, when an additional input for attachment is sensed, the control unit 120 may attach the remaining parts of data, remaining in the memory unit 130, in succession. Such an embodiment is described in more detail below.

Figure 10:
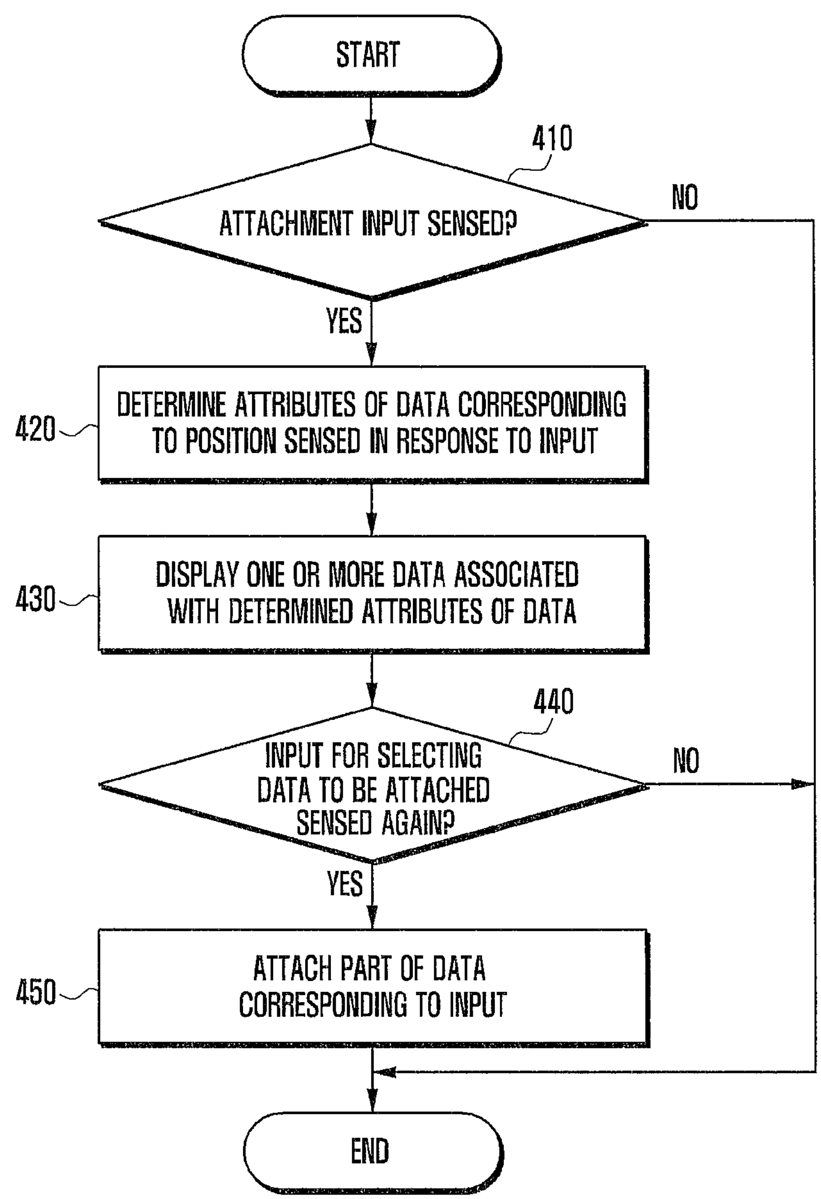
FIG. 10 is a flowchart illustrating a method of editing a document in the mobile terminal in accordance with various embodiments of the present disclosure.

FIG. 10 is a flowchart illustrating a method of editing a document in a mobile terminal in accordance with various embodiments of the present disclosure.

In various embodiments of the present disclosure, the control unit 120 can store data along with their attributes. The attributes of the data may include, for example, letters, images, numbers, and special letters. The control unit 120 can store data in association with information indicating that the attributes of the data are 'letters' in the embodiment of FIG. 3.

Referring to FIG. 10, the control unit 120 determines whether or not an attachment input is sensed at operation 410.

In the document writing mode, the input unit 110 senses a user input, generates a control signal corresponding to the sensed user input, and transfers the control signal to the control unit 120. The control unit 120 can determine whether or not the attachment input is sensed by analyzing the received control signal.

In various embodiments of the present disclosure, the attachment input may be, for example, a long press input, a touch input, a double touch input, a touch & drag input, a hovering input, an attachment menu input, or an icon selection input.

When the attachment input is sensed, the control unit 120 determines the attributes of data corresponding to the position where the attachment input was sensed at operation 420.

The control unit 120 determines the position where the attachment input was sensed. The position where the attachment was sensed may correspond to a specific input space in a document that is being written. The input space may have input attributes so that data, such as letters or images, can be inputted depending on the type of document, a document writing mode, a user setting state, etc. The control unit 120 can determine the attributes of data corresponding to the position where the attachment input was sensed, that is, input attributes. Accordingly, the control unit 120 can determine whether or not a letter can be input and an image can be input at the position where the attachment input was sensed. In various embodiments, if a user writes a memo in which only letters can be input, the attributes of data corresponding to the position where an input is sensed may be 'letters'. In various embodiment if a user writes a memo in which various data can be freely input, attributes corresponding to the position where an input is sensed may include both 'letters' and 'images'.

Figure 11:
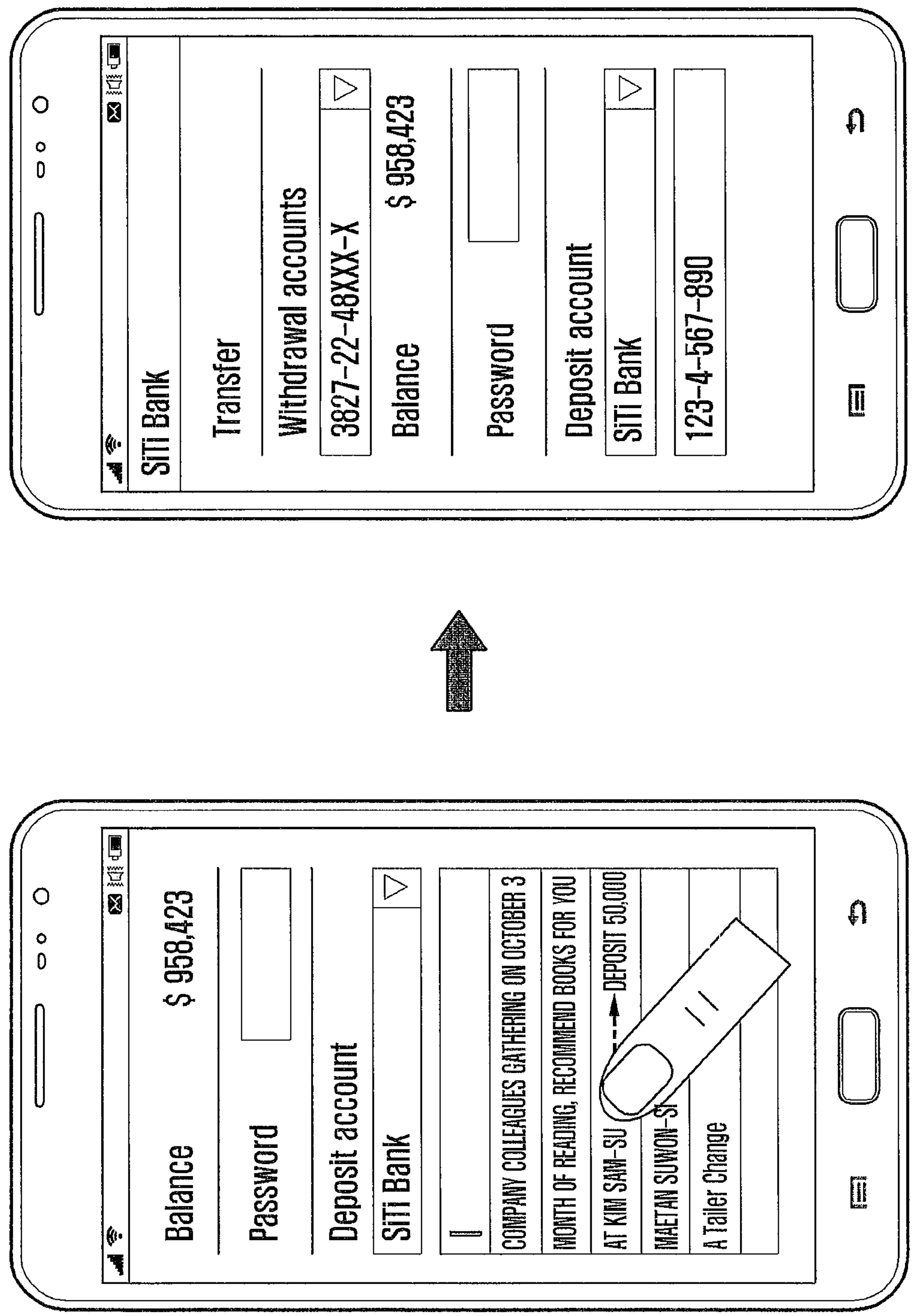
FIGS. 11 to 12 are diagrams illustrating examples in which part of data is attached based on the attributes of data in accordance with various embodiments of the present disclosure.

In an example of FIG. 11, if a user uses a bank application and the position where an input was sensed is an entry window for entering an account number, the control unit 120 may determine that the attributes of data corresponding to the position where the input was sensed correspond to 'letters'.

Figure 12:
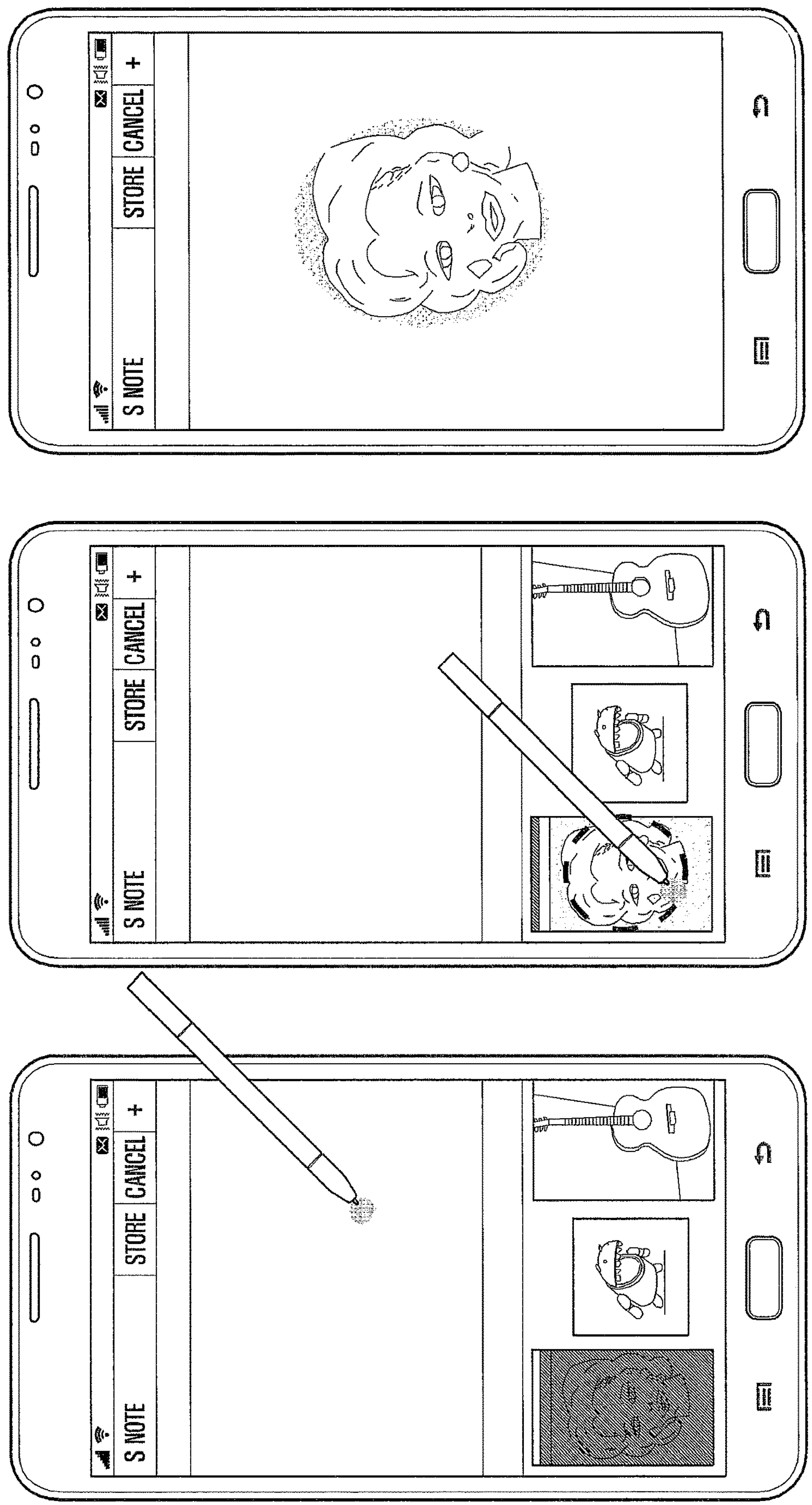

In an example of FIG. 12, if a user uses a note application for drawing an image and the position where an input was sensed is a specific position within a note, the control unit 120 may determine that the attributes of data corresponding to the position where the input was sensed correspond to an 'image'.

Next, the control unit 120 displays one or more data associated with the determined attributes at operation 430.

The control unit 120 extracts data, corresponding to the attributes of the data corresponding to the position where the attachment input was sensed, from data stored in association with attribute information. In the example of FIG. 11, the control unit 120 extracts data having 'letters' as data attributes. In the example of FIG. 12, the control unit 120 extracts data having an 'image' as data attributes.

The control unit 120 controls the display unit 140 so that the extracted data is displayed. Here, the control unit 120 may display the extracted data in a list form and may display the extracted data at the position where the attachment input was sensed, in an additional list window, or near an input region in which the attachment input was sensed.

Referring to FIG. 11, the control unit 120 can display one or more letter data, extracted in a drop box form, on the lower side of an account number entry window, that is, the position where an input was sensed. Furthermore, referring to FIG. 12, the control unit 120 may display one or more image data, extracted using an additional clipboard list window, on the lower side.

Next, the control unit 120 determines whether or not an attachment input is sensed again at operation 440.

The control unit 120 determines whether or not an input for selecting data to be attached is sensed in the list of the displayed data. The input for selecting data to be attached may be, for example, a long press input, a touch input, a double touch input, a touch & drag input, or a hovering input to specific data in the list of the displayed data. Referring to FIG. 11, an input for attachment input may be a touch & drag input to "123-4-567-890", that is, at least part to be copied, in "Deposit 50,000 Korean Won at Kim Sam-sung Siti 123-4-567-890" that is specific letter data on a list. Furthermore, referring to FIG. 12, the input for selecting data to be attached may be a touch & drag input that forms a closed space for at least part of specific image data in a list which will be copied.

An attachment input can be sensed several times. The control unit 120 may sense an input for selecting data to be attached in the list of displayed data as described above and sense an input to a region where data will be attached. An input for a region on which attachment will be performed may be a long press input, a touch input, a double touch input, a touch & drag input, or a hovering input for an attachment start position, an attachment middle position, or an attachment end position. An input to a region on which attachment will be performed may be a touch & drag input that forms a closed space for at least part of an input region. For example, the closed space may be a rectangular space that is formed in response to a drag input in a specific direction after a touch input for an attachment start position. When an input for selecting data to be attached is sensed, the control unit 120 attaches at least part of the data corresponding to the input at operation 450.

When the input for selecting data to be attached is sensed, the control unit 120 can obtain input attribute information, including information about the position where the input was generated, information about the direction of the input, information about the length of the input, and information about a shape of the input, from an application or a control signal corresponding to a user input. For example, if the input for selecting data to be attached is a touch & drag input, the control unit 20 can obtain information about the position where a touch has occurred and the direction and length of a drag. The control unit 120 can determine specific data corresponding to an input, the position where data will be attached, and at least part of data to be attached based on information about the input.

The control unit 120 attaches at least part of data, corresponding to an input for selecting data to be attached, to the position where the input was sensed. Here, the control unit 120 can extract part of the data to be attached based on input attributes including at least one of the position, direction, length, and shape of the input. Part of the data may be part of all letters that form the data or part of an image. In various embodiments, the control unit 120 can attach part of data in a specific unit. For example, if data includes alphabet data, the control unit 120 can attach part of the data in each letter unit, each sentence unit, or each paragraph unit. In an implementation, the control unit 120 may cancel (i.e., delete) part of the attached data in response to an input.

Referring to FIG. 11, the control unit 120 can attach "123-4-567-890", corresponding to a user input, to the account number entry window where an input was generated.

Furthermore, referring to FIG. 12, the control unit 120 can attach part (e.g., a facial part) of an image, corresponding to a user input, to a specific position of a note at which an input was generated.

In various embodiments of the present disclosure, the control unit 120 may delete an attached part from the memory unit 130 or attach a part, corresponding to an additional input, from specific data that has been partially deleted, in response to an additional input for attachment.

In accordance with the method of editing a document in a mobile terminal and the mobile terminal using the same in accordance with the present disclosure, a user can edit a document in various ways by copying various data to a clipboard and attaching selected data, if necessary.

Furthermore, in the method of editing a document in a mobile terminal and the mobile terminal using the same in accordance with the present disclosure, only part of data copied to a clipboard is selected and attached in response to a user input, thereby enabling a user to edit a document more conveniently.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of attaching data in a mobile terminal, the method comprising:

storing a plurality of data including text data and image data corresponding to a copying event;

sensing a first input for selecting an entry window of a screen where at least one data of the plurality of data is to be attached;

determining, in response to the first input, attribute information of the entry window, the attribute information of the entry window comprising at least one of a letter and an image;

extracting and displaying the text data from the plurality of data in response to the attribute information indicating a letter and the image data from the plurality of data in response to the attribute information indicating an image, wherein the displayed text data or the image data is displayed in a list; and attaching, in response to sensing a second input for selecting, one of the at least one data at the entry window of the screen, wherein the second input also includes a drag input defining a shape of an attachment input in the displayed list corresponding to a portion of the at least one data attached to the entry window.

2. The method of claim 1, further comprising:

sensing a drag input on an area of the screen other than an area of the entry window;

extracting at least part of data of the plurality of data based on at least one of a position, a direction, a length, or a shape of the drag input; and attaching the extracted data on the screen.

3. The method of claim 2, wherein the attaching the extracted data comprises attaching, if the drag input in a first direction is sensed, at least part of the data, corresponding to a length of the drag input in the first direction, in a letter unit.

4. The method of claim 2, wherein the attaching the extracted data comprises attaching, if the drag input in a second direction is sensed, at least part of the data, corresponding to a length of the drag input in the second direction, in a multiple letter unit.

5. The method of claim 2, wherein the attaching the extracted data comprises deleting at least part of the attached data in a letter unit if the drag input in a third direction opposite to the first direction is sensed.

6. The method of claim 2, wherein the attaching the extracted data comprises attaching one region of the data included in a closed space if the shape of the drag input forms the closed space.

7. An electronic device, comprising:

a touch screen;

a memory; and at least one processor configured to:

control the memory to store a plurality of data including text data and image data corresponding to a copying event, sense, via the touch screen, a first input for selecting an entry window of a screen where at least one data of the plurality of data is to be attached, determine, in response to the first input, attribute information of the entry window, the attribute information of the entry window comprising at least one of a letter and an image, extract the text data from the plurality of data in response to the attribute information indicating a letter and the image data from the plurality of data in response to the attribute information indicating an image, display, via the touch screen, the text data in response to the attribute information indicating a letter and the image data in response to the attribute information indicating an image, wherein the displayed text data or the image data is displayed in a list, and attach, in response to sensing a second input for selecting, one of the at least one data at the entry window of the screen, wherein the second input also includes a drag input defining a shape of an attachment input in the displayed list corresponding to a portion of the at least one data attached to the entry window.

8. The electronic device of claim 7, wherein the at least one processor is configured to:

sense, via the touch screen, a drag input on an area of the screen other than an area of the entry window, extract at least part of a data of the plurality of data based on at least one of a position, a direction, a length, or a shape of the drag input, and attach the extracted data on the screen.

9. The electronic device of claim 8, wherein the at least one processor is configured to attach at least part of the data, corresponding to a length of the drag input in a first direction, in a letter unit if the drag input in the first direction is sensed.

10. The electronic device of claim 8, wherein the at least one processor is configured to attach at least part of the data, corresponding to a length of the drag input in a second direction, in a multiple letter unit if the drag input in the second direction is sensed.

11. The electronic device of claim 8, wherein the at least one processor is configured to delete the attached part of the data in a letter unit if the drag input in a third direction opposite to the first direction is sensed.

12. The electronic device of claim 8, wherein the at least one processor is configured to attach one region of the data included in a closed space if the shape of the drag input forms the closed space.

* * * * *